(12) United States Patent
McNeal

(10) Patent No.: US 10,119,288 B2
(45) Date of Patent: Nov. 6, 2018

(54) DEVICE FOR CREATING A FULCRUM TO REDUCE PHYSICAL EFFORT

(71) Applicant: Jeffrey Lynn McNeal, Melbourne, FL (US)

(72) Inventor: Jeffrey Lynn McNeal, Melbourne, FL (US)

(*) Notice: Subject to any disclaimer, the term of this patent is extended or adjusted under 35 U.S.C. 154(b) by 0 days.

(21) Appl. No.: 15/693,081

(22) Filed: Aug. 31, 2017

(65) Prior Publication Data

US 2018/0106060 A1    Apr. 19, 2018

Related U.S. Application Data

(63) Continuation of application No. 15/297,504, filed on Oct. 19, 2016, now Pat. No. 9,777,497.

(51) Int. Cl.
*E04H 4/16*  (2006.01)
*F16M 13/04*  (2006.01)

(52) U.S. Cl.
CPC ........... *E04H 4/1609* (2013.01); *F16M 13/04* (2013.01)

(58) Field of Classification Search
CPC ....... A46B 15/00; E04H 4/1609; F16M 13/04
See application file for complete search history.

(56) References Cited

U.S. PATENT DOCUMENTS 7,578,611 B2 *  8/2009  Hamilton ............. B01F 7/0005
                                                       366/129

* cited by examiner

*Primary Examiner* — Shay Karls
(74) *Attorney, Agent, or Firm* — John L. DeAngelis; Beusse Wolter Sanks & Maire, PLLC

(57) ABSTRACT

A device is disclosed comprising a rigid frame having disposed thereon at least one opening for receiving a pole of a pool brush, the device further having means for securing the device in stationary position. The opening has a perimeter defining a surface adapted for use as a fulcrum. Means for securing the device may be one or a plurality of footpads, or it may be an elongated cord connected to the frame and adapted to secure about a stationary object.

19 Claims, 5 Drawing Sheets

DEVICE FOR CREATING A FULCRUM TO REDUCE PHYSICAL EFFORT

The present application claims priority as a continuation application to the non-provisional application filed on Oct. 19, 2016, assigned application number 15/297,504, and entitled Fulcrum Component (now U.S. Pat. No. 9,777,497), which claims priority to the provisional application filed on Oct. 19, 2015, assigned application number 62/243,561 and entitled Fulcrum Component for Swimming Pool Pole Brush That Multiplies Brushing Force While Reducing Physical Effort. The entire disclosure of each of these applications is incorporated herein.

BACKGROUND

Swimming pool walls are typically cleaned with a long pole and brush attachment. This work is physically strenuous because it requires the person cleaning to apply adequate pressure to the brush where it contacts the pool walls, especially along the bottom of deep walls.

There is currently only one pool brushing process/technique: It utilizes a pole and brush, and depends on the user's body to provide force on the brush while stooping, bending, squatting and twisting to complete the cleaning.

SUMMARY

Disclosed is a device that would render brush-cleaning more effective. The present inventor has recognized that a device having a fulcrum, when used as disclosed herein with a standard pole and pool brush assembly, reduces the amount of force a person must exert in order to provide the same or improved cleaning of a pool wall than can be achieved with a pole and pool brush assembly alone.

A device having several embodiments is disclosed. One embodiment broadly comprises a rigid frame having disposed thereon at least one opening for receiving a pole of a typical pool brush (which is typically an elongated pole configured to receive a brush). This opening has a perimeter defining a surface adapted for use as a fulcrum. In particular, the pole of the pool brush may rest on, be supported by, or pivot about various points on of said surface (which is an inner facing surface), such that this portion of the device operates as a fulcrum.

In addition to having the opening, the frame also has an immobilizing element for immobilizing the device in a stationary position or otherwise retaining the device in a desired position. In certain embodiments the immobilizing element may be one or a plurality of footpads. The one or more footpads may be integrated in the frame itself. For instance, in an embodiment having one footpad, the device may comprise a frame having a generally hourglass shape. On one end of the hourglass, there is the opening, and the other end comprises a platform for receiving a foot. When a foot is placed on the footpad and a pole of a pool brush placed through the opening, the device is at least temporarily immobilized, rendering the opening portion of the frame available to act as a fulcrum. Embodiments are therefore drawing to a device for creating a fulcrum for supporting an elongated pole during use, the device comprising an immobilizing element for retaining the device in a desired position, and also defining an opening for receiving the pole, wherein the fulcrum is created by an inner facing surface of the opening, and where the elongated pole is urged against the inner facing surface during use. The footpad may be an over-sized region connected to a region defining the opening by the neck segment. This oversized region may be linearly aligned with the neck or set at an angle between 0 degrees and 180 degrees relative to the neck segment.

The immobilizing element is not limited to one or a plurality of footpads. The immobilizing element may also comprise an elongated cord, which may be connected on one end to the frame at the location corresponding to the fulcrum, and on the other end connected to a cuff (or equivalent). In this embodiment, the cuff is a flexible material that can be wrapped or secured around a stationary object, such as a human leg or ankle.

An advantage of the device is that it allows a person to brush a pool wall with more ease and comfort than previously possible with a pool brush alone. This is because in each of the embodiments described, the opening receives the pole of a pool brush and acts as a fulcrum, with the pole acting as a lever. By moving the pole of the pool brush up and down, and at the same time against the fulcrum, a user experiences a much more effective brush stroke than could be achieved previously with a pole and pool brush assembly alone. Because the device lowers the amount of force the user is required to exert (the exerted force being multiplied by the lever action), it eliminates the need for the user to adopt uncomfortable body positions necessary to exert adequate force on a pool brush.

Other embodiments of the device are envisioned as detailed in the detailed description below, the disclosure of which is incorporated in this Summary. For example, the frame of the device may have a generally cruciform shape, with side and bottom arms corresponding to foot pads, while the top arm has the fulcrum. Alternatively, said arms may be nonsymmetrical.

Embodiments of the device may be configured to elongate when necessary. This may be advantageous when the device is used to clean not only a standard perimeter pool wall, but also an interior pool wall (e.g., where the device is used to clean an interior wall below a pool bench). In these embodiments, the distance between the opening and the location where the device is secured is not fixed. To accomplish this, the frame of the device may be configured to receive an elongated cord (such as a bungee cord) which itself may be configured to communicate with a secure object. An example would be the device wherein the cord is attached to a cuff that may be wrapped or tied around a secure object, such as a leg or nearby pole. Embodiments that allow for the adjustment of the distance between the immobilizing element and the fulcrum are also disclosed, such as where the neck further comprises a telescoping bridge and means for locking the bridge such that the desired distance is achieved.

Alternatively, embodiments are drawn to a kit which includes not only the devices disclosed, but also a pole and/or a pool brush, or a pole and pool brush assembly (a combination including both). The pool brush of said kit may comprise one or a plurality of bristled brushes suitable for connection to a pole.

Advantages of the device include more efficient cleaning of pools using standard pool brushes. Pool brushing as currently performed is exhausting and strenuous and most individuals are not strong enough to apply sufficient pressure (force) to the pole, such that a sufficient amount of force is transferred to the brush itself. In the case of pools, the typical substance being brushed is algae growth on pool walls. The worst cases of algae build-up can only be removed by standard pool brushes by individuals with great physical strength. The presently disclosed device allows a user's force to be harnessed more efficiently. Users may apply a smaller force yet see the same or improved algae removal.

For this reason, the device permits users of smaller sizes and builds to achieve cleaning results previously achieved by those who possess greater physical strength.

By way of example, one of the biggest issues with brushing a pool is over time the user bends the pole because of the force necessary to hold the brush against the wall in the normal method. Because of the longer distance (120") from the brush to the fulcrum using a typical pole and brush, typical unaided brushing subjects the pole to a bending force of 12 lbs maximum to exert 3 lbs of brush pressure on the bottommost portions of the pool wall. When the same action is performed using the device of embodiments, the user is only required to exert between 4-5 lbs of bending force maximum because the brush is a shorter distance (90" in embodiments) from the fulcrum at the bottom of the wall. Less than half the force need be applied to apply the same force on the brush. The foregoing example assumes an 8' wall brushed by a person of height 5'9".

DETAILED DESCRIPTION

Figure 1:
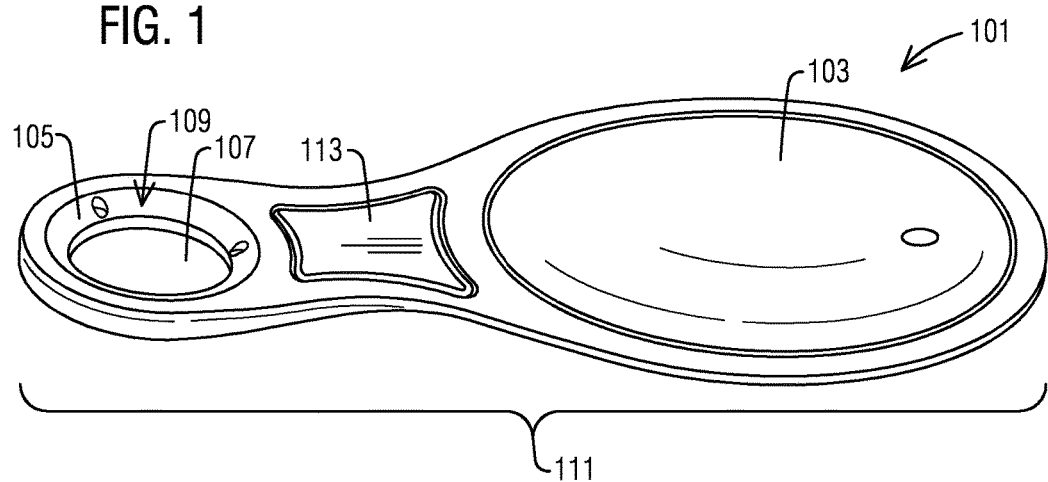
FIG. 1 is a perspective view of the device, in accordance with an embodiment.

Embodiments are described herein with reference to the attached figures wherein like reference numerals are used throughout the figures to designate similar or equivalent elements. The figures are not drawn to scale and they are provided merely to illustrate aspects disclosed. Several disclosed aspects are described below with reference to non-limiting example applications for illustration. It should be understood that numerous specific details, relationships, and methods are set forth to provide a full understanding of the embodiments disclosed. One having ordinary skill in the relevant art, however, will readily recognize that the disclosed embodiments can be practiced without one or more of the specific details or with other components. In other instances, well-known structures or operations are not shown in detail to avoid obscuring aspects disclosed. The claims herein include equivalent structures insofar as they do not depart from the spirit and scope of the disclosed embodiments.

With reference to FIGS. 1-4, embodiments of the device broadly comprise a rigid frame 111 having disposed thereon at least one opening 107 for receiving a pole of a pool brush. The frame may be PVC, hard plastic, metal, or another rigid material, preferably resistant to chemical reaction with chlorine. The frame incorporates both opening 107 as well as a footpad 103. In the embodiment of FIG. 1-4, the fulcrum 109 is integral to a frame 111. The frame 111 may be a structure having at least one footpad 103 and an opening 107, the perimeter of which defines the fulcrum. The footpad may be in communication with the fulcrum via a neck segment 113 (hereinafter referred to as "neck"), which may be a tapered neck as shown. The opening 107 has a perimeter defining a surface 105 adapted for use as a fulcrum. In particular, the pole of the pool brush may rest on, be supported by, or pivot about various points on said surface 105, such that this portion of the device operates as a fulcrum.

For ease of reference, the term "fulcrum" shall refer generally to the portion of the device having the opening and its associated surfaces. In other words, the term "fulcrum" 109 broadly refers to a surface 105 upon which the pole of a pool brush exerts a force during use of the device and any surrounding hardware, including the frame in the vicinity of the opening 107. The surface 105, like the frame 111, is preferably a rigid surface such as hard plastic. The surface 105 may also be a slip ring made of (or coated with) a material with a low coefficient of friction, such as Teflon®.

As can be seen from the Figures of embodiment 101, an over-sized region 103 (which is a footpad in embodiments) is connected to a region defining the opening (fulcrum 109) by the neck segment 113. Although the embodiment 101 has the oversized region linearly aligned with the neck 113, other configurations are permissible. The over-sized region may be set at an angle between 0 degrees and 180 degrees relative to the neck segment.

Figure 2:
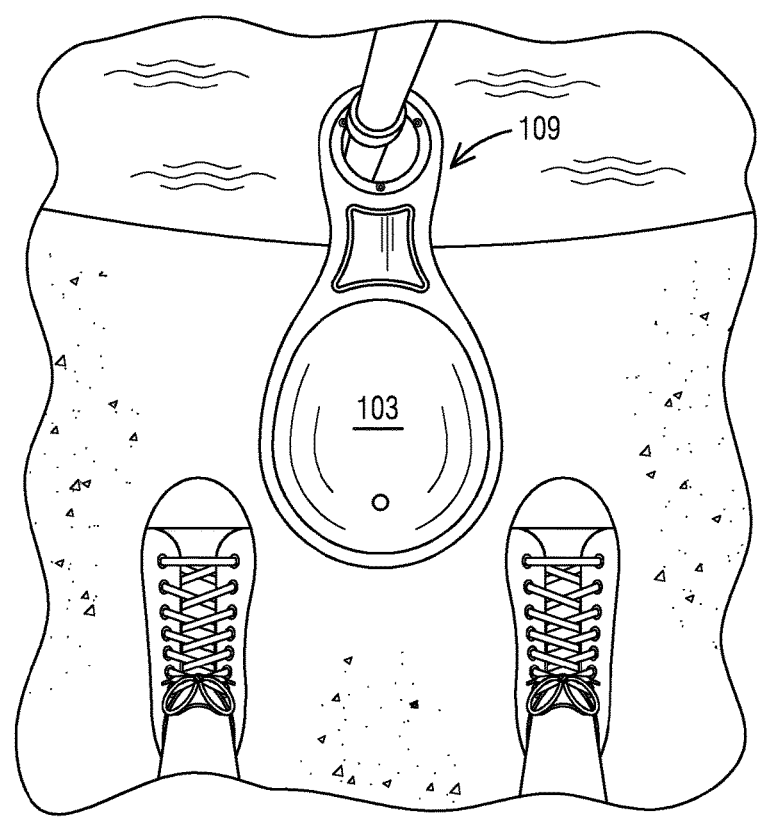
FIG. 2 is an environmental view of the device, in accordance with an embodiment.
Figure 3:
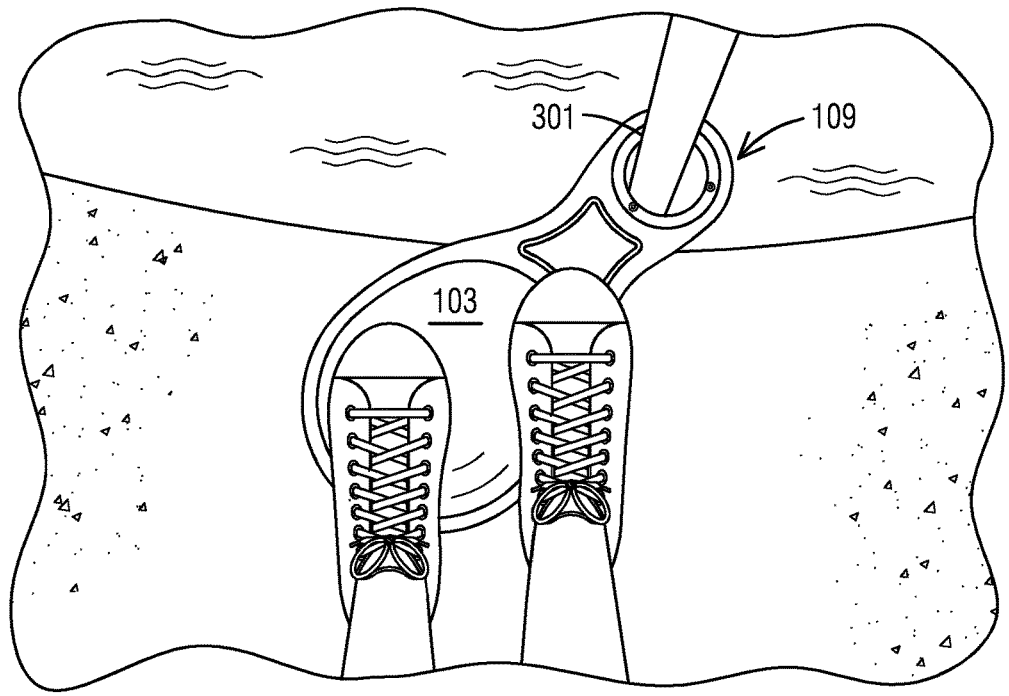
FIG. 3 is an alternate environmental view of the device, in accordance with an embodiment.
Figure 4:
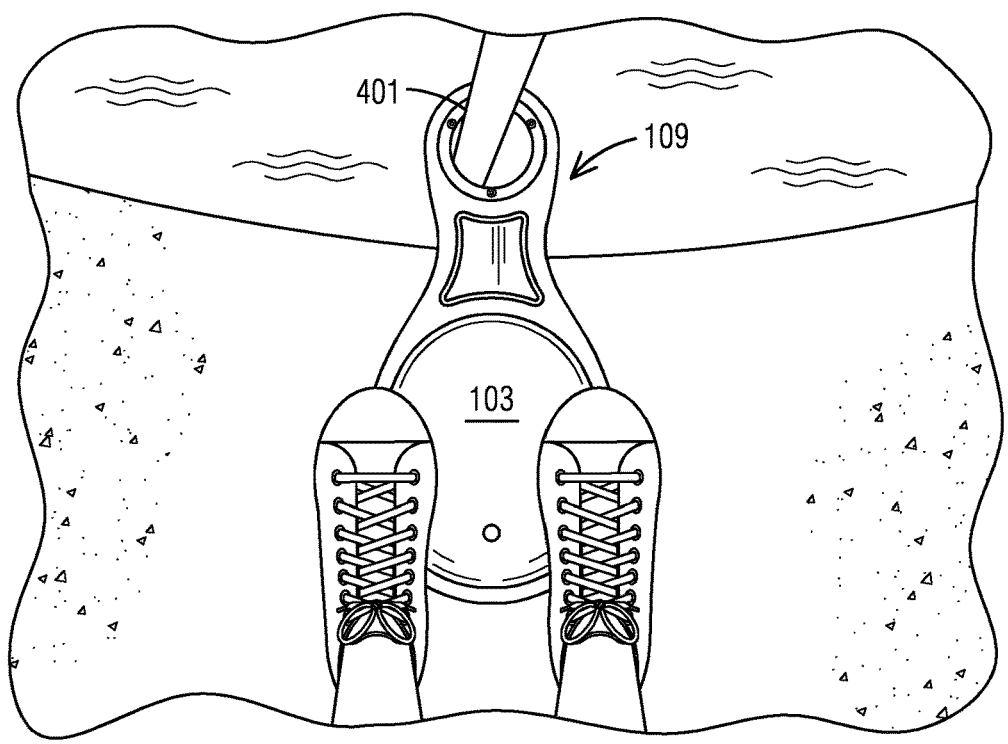
FIG. 4 is an alternate environmental view of the device, in accordance with an embodiment.

To use the device, the device is placed flat on the pool deck such that the portion of the frame corresponding to the fulcrum extends a given distance beyond the deck edge over the water. This is shown in FIG. 2. In the embodiment of FIGS. 1-4, the fulcrum 109 extends approximately 3-6 inches over the water. As shown in FIGS. 3-4, the user stands on the foot pad 103 which immobilizes and anchors the frame 111 and fulcrum 109, holding the fulcrum 109 in place over the water and away from the deck edge. The user places a pole and brush assembly through the opening 107 where the pole can then slide up and down against the fulcrum 109 (at a desired pivot point), applying a force to the brush while brushing the walls. Facing the pool, the user stands on the footpad(s) and pushes the pole away from their body, thereby applying a force with the pole against the fulcrum. This force transfers to the brush portion of the pole and pool brush assembly and continues as the brush moves against the wall. Moving the pole up and down while maintaining pole contact with the fulcrum provides the brushing action and force necessary to clean the pool walls.

Furthermore, the device is particularly effective in improving the upward brush stroke of a standard pole and pool brush assembly. The present inventor recognized that the upward and downward brush strokes of a pool brush differ in the type of force a person applies, and that a device having a fulcrum may alleviate some or all of these issues. In particular, the downward stroke is typically easier, given the person's use of body weight. Most individuals can perform a smooth downward brush stroke, albeit with considerable effort. However, the upward stroke typically causes the pool brush to "skip" along the pool wall. Without the device, it is difficult to perform a continuous, effective brush stroke in the upward direction using a standard pool brush. Adding a mechanical fulcrum to the pole/brush combination multiplies the human physical force applied to the brush and reduces the physical effort and body contortions necessary to keep the brush firmly in contact with the wall being cleaned. The disclosed device differs from current brush-related products. Furthermore, there are currently no mechanical devices (a fulcrum) in the pool brushing process that multiply the force of the pool pole (a lever) on the brush to ensure complete cleaning, nor a device that allows the user to stand in a comfortable position throughout the cleaning process while exerting much less physical effort to accomplish the task.

Returning to the construction of the device, surface 105 is any surface defined by the perimeter of opening 107 (which is a circular opening in embodiments or even "u" shaped, but may take on other open shapes, such as the quadrangular shape of embodiment 711). The inner facing surface on the fulcrum where the pole exerts a force is referred to as a pivot point, and the device is designed to have multiple pivot points.

In fact, the pivot point of the fulcrum may be any point along the surface 105. For instance, in the example use scenario of FIG. 3, a pivot point 301 is located on said surface, corresponding to a 10 o'clock position of the opening 107. This use accommodates situations where the pool deck surface is very narrow, as in the case of portions of the deck that surround flower beds; as can be seen in the Figure, the longitudinal axis of the device is angled approximately 30 degrees relative to the pool perimeter. In FIG. 4, where the longitudinal axis of the device is perpendicular to the pool perimeter, the pivot point 401 is located on the 12 o' clock position. Therefore, one of the advantages of the device is its ability to accommodate various deck conditions and configurations.

The frame of the device has an overall length that will typically correspond to the distance a person stands from the pool when operating a pole and pool brush assembly. Therefore, the length of most embodiments will be the length of an average adult's arm, however it is understood that frames of various lengths may be used. In the embodiment of FIGS. 1-4, for instance, the length of the entire device includes the fulcrum and the footpad, the footpad of which is the length of an average male foot.

Figure 5:
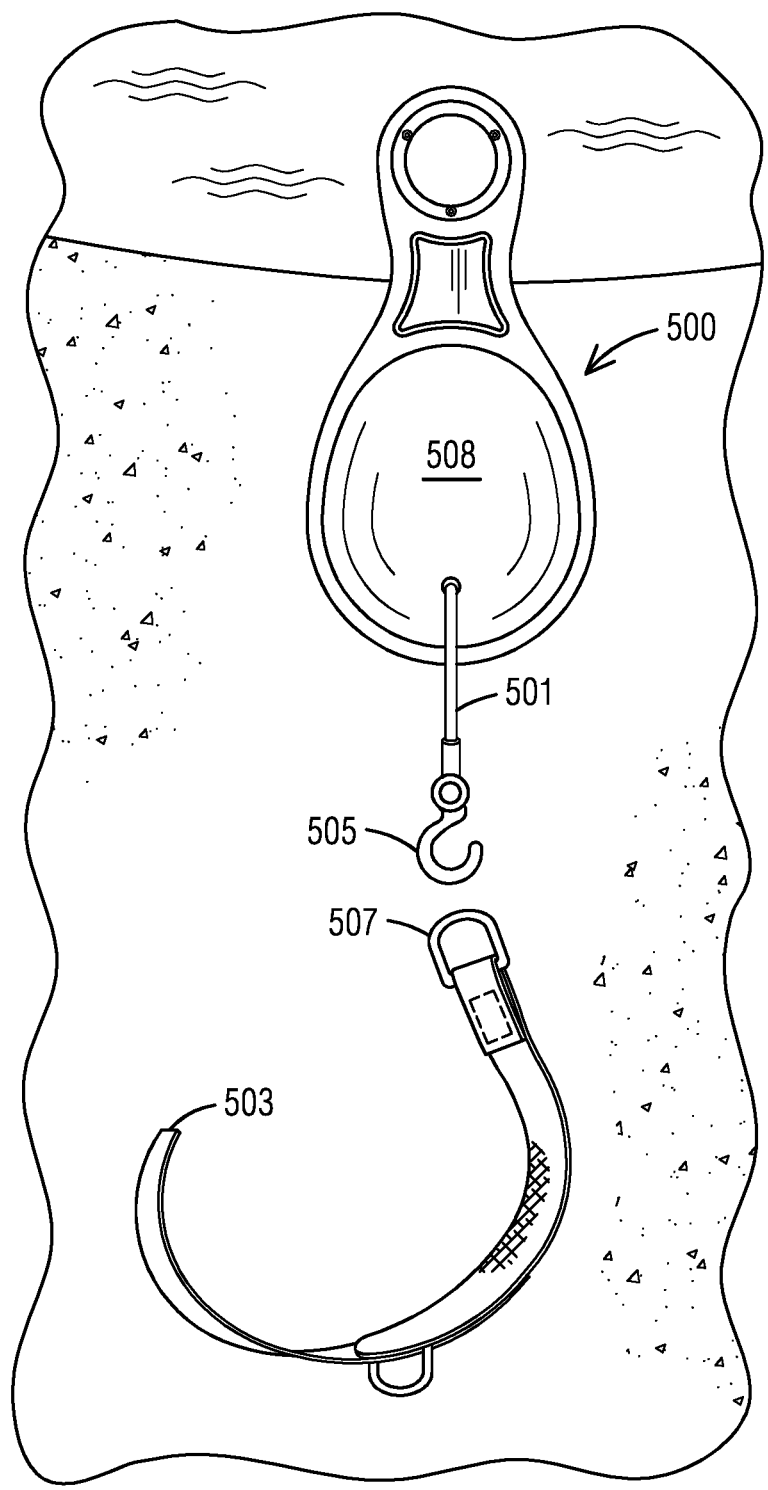
FIG. 5 is an exploded view of the device having an elongated cord, in accordance with an embodiment.

However, embodiments are disclosed that are capable of conforming to variable lengths. Reference is made to the embodiment 500 of FIGS. 5 and 6. In this embodiment, the footpad 508 is connected to an elongated cord 501, the elongated cord 501 having a first and second end (not numbered), wherein the elongated cord is attached to the footpad 508 on the first end and adapted to receive a cuff 503 on a second end. The cord may be any study cord, such as a bungee cord. Embodiment 500 is shown with the cuff 503 unattached to the cord 501. The means of attaching the cord to the cuff may be a standard hook and loop connection, shown as 505 and 507, respectively.

Figure 6:
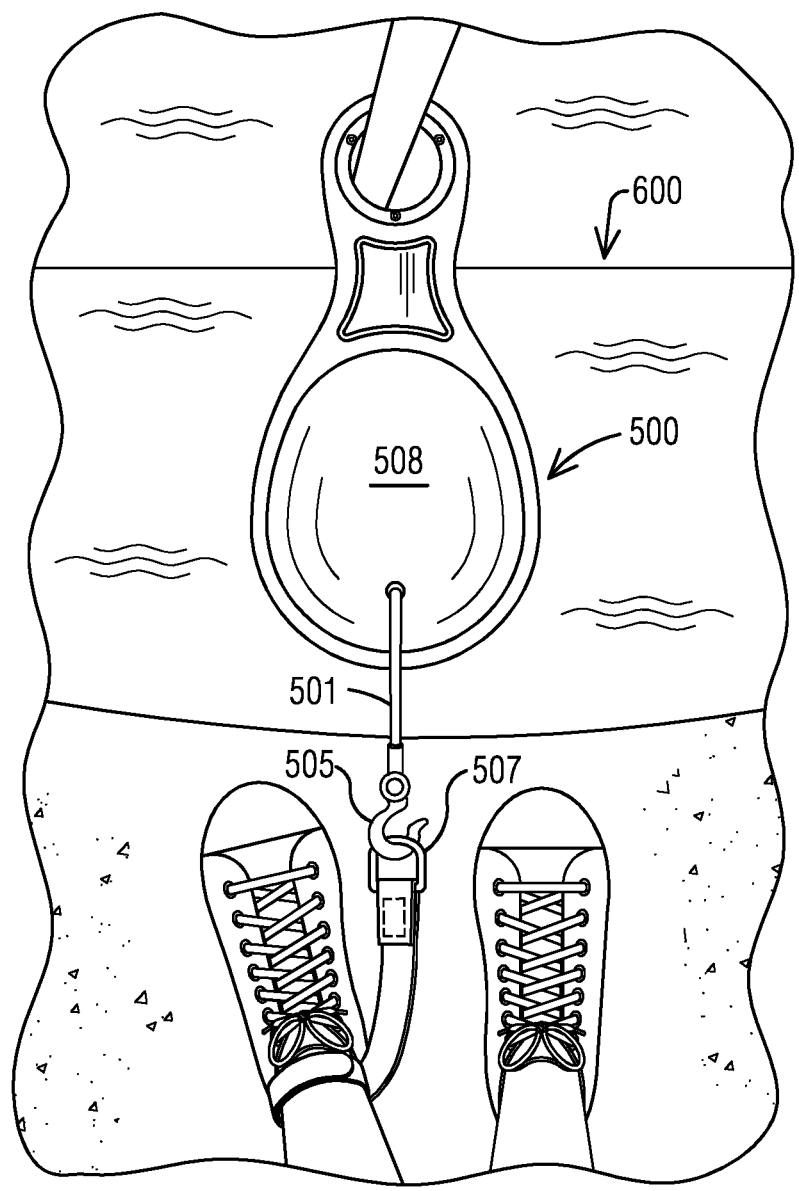
FIG. 6 is an alternate environmental view showing the device having an elongated cord in use, in accordance with an embodiment.

This embodiment is particularly advantageous when the wall of the pool to be cleaned is not an immediate perimeter wall. For instance, the pool of FIG. 6 has a shallow, internal bench. As depicted in FIG. 6 (in contrast with FIG. 2), the fulcrum must extend a much greater distance over the pool to reach the wall of the pool that extends beyond the bench. Therefore, an embodiment of the device is configured to allow for adjustability of the distance between the immobilizing element and the fulcrum. For instance, if the immobilizing element is a footpad (such as the footpad 103) the device may be configured to allow the user to adjust the distance between the footpad and the fulcrum, In such a case, the intervening neck 113 may further include a telescoping bridge that allows a user to adjust the distance between the footpad and the fulcrum so that the overall device is longer or shorter as the cleaning situation requires. In such an embodiment, the telescoping bridge also includes a lock mechanism to secure the bridge such that the desired distance is achieved.

Figure 7:
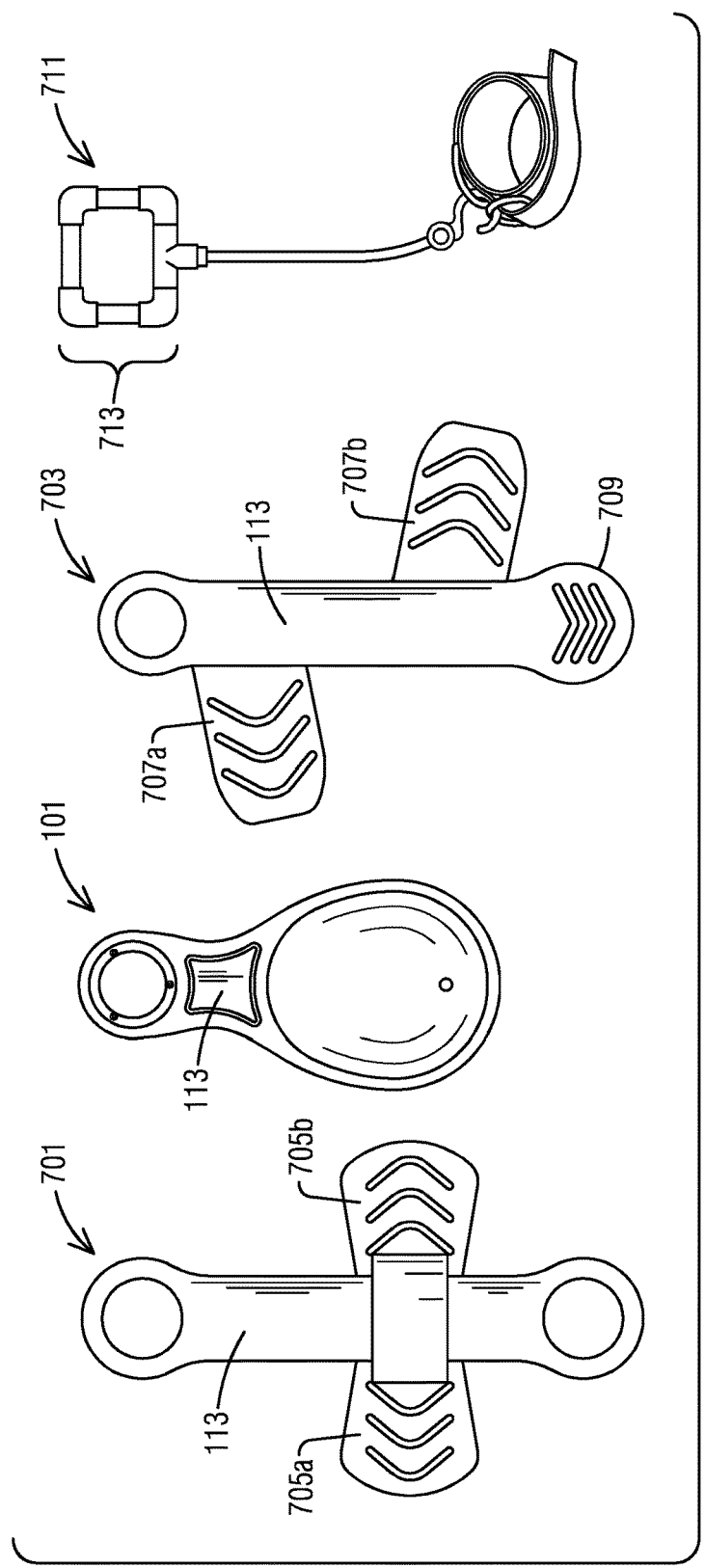
FIG. 7 depicts various embodiments of the device.

As seen in FIG. 7, the footpad may be replaced with other means for immobilizing the device. Embodiments 701 and 703 have the fulcrum, neck, and frame of the embodiment of FIGS. 1-4. In FIG. 7, embodiment 701 is cruciform (cross shaped), preferably having four arms which are communicably connected at the neck 113. The top and/or bottom arms of the cross shape corresponds to the fulcrum, and the two side arms are footpads 705a, 705b. The footpads of this embodiment are of equal length. As with other embodiments, the frame and fulcrum are immobilized during brushing by standing on footpad(s) 705a/705b that are also integral to the frame.

In the embodiment 703, two footpads extend asymmetrically off neck 113 (707a, 707b), and the bottom arm 709 of the frame is also a footpad. The footpads of any embodiment may have textured tread (not numbered) to enhance grip of a person's feet thereon. This feature is depicted in embodiments 701 and 703.

For pools without decks the frame may be adapted to suit other pool configurations where foot pads would not apply, like an above ground pool with no deck surrounding it. Different immobilizing features would be required, but all would utilize the fulcrum, the key to this invention. For instance, embodiment 711 comprises a fulcrum 713 attached to means for immobilizing or stabilizing the fulcrum. In this embodiment, the frame is secured or stabilized by a cord connected to a cuff which may be secured around the leg of a user.

The entire assembly may comprise a solid frame defining a footpad connected to a fulcrum. In other embodiments, the device is a frame having a fulcrum on at least one end and at least a footpad on the other end, each end separated by a neck, such as the neck 113 as shown in the Figures. The device may be one piece made of PVC type plastic with integral fulcrum, frame and foot pads built into the frame. Or, individual major component parts/features may be assembled to complete the assembly.

The opening 107 may be sized to accommodate the various pole diameters. One feature of the opening 107 is that it is sufficiently wide to allow a user to move the brush in many directions within the opening. When cleaning a pool, the brush pole is most commonly moved linearly (up and down, parallel to and in contact with the pool wall). However, the movement of the brush pole using the device is not limited to linear movement, nor is the brush limited to a position parallel to the pool wall. As mentioned previously, the pivot point of the fulcrum may be on any surface defined by the opening 107. The fulcrum is wide enough to permit the brush to contact a pivot point such that the brush moves horizontally or in an arc, if the user so chooses. For instance, if the pole was positioned as shown in FIG. 2 (pivot point at 8 o'clock), the pole may be moved by a user in a direction perpendicular to the pole axis, causing the brush to swing in an upward arc.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. A device comprising:
a rigid frame defining therein an opening for receiving a pole configured to receive a pool brush, the opening unobstructed such that the pole can be disposed at any location within the opening and can be oriented at any angle relative to the frame to contact any point on a circumference of the opening, a point of contact between the pole and the circumference serving as a fulcrum during use of the pole and the pool brush; and
an immobilizing element for immobilizing the device, wherein the immobilizing element comprises a footpad extending from the rigid frame via an intervening neck segment.

2. The device of claim 1 wherein the footpad comprises a platform for receiving a user's foot.

3. The device of claim 1 wherein the footpad is oriented at an angle between 0 degrees and 180 degrees relative to the neck segment.

4. The device of claim 1 wherein the immobilizing element comprises at least two footpads extending from the rigid frame via an intervening neck segment, the at least two footpads having a cruciform shape or asymmetrically extending from the neck segment.

5. The device of claim 1 wherein the opening comprises a circular opening.

6. The device of claim 1 wherein the immobilizing element comprises an elongated cord having a first and second end, the first end attached to the frame and the second end adapted to receive a cuff.

7. The device of claim 6 wherein the elongated cord comprises an elasticized cord having a hook member at the second end, the hook member adapted to receive the cuff.

8. The device of claim 7 wherein the cuff comprises a flexible material extendable to fasten and secure the cuff around a stationary object.

9. The device of claim 8 wherein the stationary object comprises a human leg or a human ankle.

10. A kit comprising the device of claim 1 and a pole configured to receive a pool brush.

11. The device of claim 1 the pole for receiving a brush at one end of the pole, the brush for use in brushing side wall surfaces of a pool, a desired position of the device comprising the opening overhanging a side wall of the pool.

12. A device for creating a fulcrum for supporting an elongated pole during use, the device comprising an immobilizing element having a flat lower surface for placement on a flat surface during use, application of a downwardly directed force on the immobilizing element during use for retaining the device in a desired position on the flat surface, and the device defining an opening within a frame, the opening for receiving the pole, the fulcrum created wherever the pole contacts an inner facing surface of the opening during use, the frame and the immobilizing element connected via an intervening neck segment.

13. The device of claim 12 wherein the immobilizing element comprises at least one footpad for receiving at least one of a user's feet such that application of a downward force on the footpad by the user during use restrains the device against movement.

14. The device of claim 12 wherein the immobilizing element comprises at least two footpads asymmetrically oriented relative to the neck segment.

15. The device of claim 12 wherein the immobilizing element comprises at least two footpads having a cruciform shape.

16. The device of claim 12 the opening further comprising a circular opening.

17. The device of claim 12 the elongated pole for receiving a brush at one end of the pole, the pole and attached brush for use in brushing side wall surfaces of a pool, a desired position of the device comprising the opening overhanging a side wall of the pool.

18. The device of claim 12 wherein the immobilizing element comprises an elongated cord having a first and second end, the first end attached to the frame and the second end adapted to receive a cuff.

19. The device of claim 18 wherein the cuff comprises a flexible material extendable to fasten and secure the cuff around a stationary object.

* * * * *